US 7,111,284 B2

(12) United States Patent
Takagi et al.

(10) Patent No.: US 7,111,284 B2
(45) Date of Patent: Sep. 19, 2006

(54) SYSTEM AND METHOD FOR MAPPING STRUCTURED DOCUMENT TO STRUCTURED DATA OF PROGRAM LANGUAGE AND PROGRAM FOR EXECUTING ITS METHOD

(75) Inventors: Wataru Takagi, Tokyo (JP); Daisuke Yokotsuka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 882 days.

(21) Appl. No.: 09/988,438

(22) Filed: Nov. 20, 2001

(65) Prior Publication Data

US 2002/0107867 A1    Aug. 8, 2002

(30) Foreign Application Priority Data

Jan. 18, 2001    (JP)    ............................. 2001-009650

(51) Int. Cl.
*G06F 9/45*    (2006.01)
(52) U.S. Cl. ........................................ 717/136; 717/137
(58) Field of Classification Search ................ 717/143; 715/513; 706/47; 700/295
See application file for complete search history.

(56) References Cited

U.S. PATENT DOCUMENTS

| | | | |
|---|---|---|---|
| 5,970,490 A | 10/1999 | Morgenstern | |
| 6,009,436 A | 12/1999 | Motoyama et al. | |
| 6,085,196 A | 7/2000 | Motoyama et al. | |
| 6,279,015 B1 | 8/2001 | Fong et al. | |
| 6,594,823 B1 * | 7/2003 | Corbin et al. | 717/143 |
| 6,826,552 B1 * | 11/2004 | Grosser et al. | 706/47 |
| 2004/0138787 A1 * | 7/2004 | Ransom et al. | 700/295 |
| 2005/0022115 A1 * | 1/2005 | Baumgartner et al. | 715/513 |

OTHER PUBLICATIONS

"Document Object Model (DOM) Level 1 Specification," W3C Recommendation, Oct. 1, 1998, www.w3.org/TR/REC-DOM-Level-1/, 3 pages.
"SAX 2.0: The Simple API for XML," www.megginson.com/SAX/sax.html, 1 page.
"XML Path Language (XPath)," Version 1.0, W3C Recommendation, Nov. 16, 1999, www.w3.org/TR/1999/REC-xpath-19991116, 31 pages.

* cited by examiner

*Primary Examiner*—Wei Zhen
*Assistant Examiner*—Mark P. Francis
(74) *Attorney, Agent, or Firm*—Townsend and Townsend and Crew LLP

(57) ABSTRACT

The data transcription processing unit is prepared. This unit is beforehand provided with the document-structure definition information on the structured documents, i.e., the processing target, the structure definition information on the program language, and the correspondence information between the document-structure definition and the structure definition. Then, a reading/writing request is issued from the application program to the data transcription processing unit. The issue of the request accomplishes the data transcription on each element basis between the structured documents and the structure of the program language.

12 Claims, 11 Drawing Sheets

FIG. 5

```
<?xml version="1.0"?>
<!DOCTYPE order [
  <!ELEMENT order (address, item+)>          — 71
  <!ELEMENT address (#PCDATA)>               — 72
  <!ELEMENT item (itemname, price, quantity)>— 73
  <!ELEMENT itemname (#PCDATA)>
  <!ELEMENT price (#PCDATA)>
  <!ELEMENT quantity (#PCDATA)>
]>
```

710

```
<order>
  <address>WWW PREFECTURE XX CITY YY WARD ZZZZ</ADDRESS>   — 720
  <item>
    <item name>MY BOOK</item name>
    <price>1000</price>                                     — 731
    <quantity>2</quantity>
  </item>
  <item>
    <item name>YOUR BOOK</item name>
    <price>1500</price>                                     — 732
    <quantity>3</quantity>
  </item>
</order>
```

```
01  ORDER.
   02  ADDRESS   PIC   X(20)
   02  ITEM  OCCURS   2.
      03  ITEMNAME   PIC   X(15).
      03  PRICE         PIC   9(9)   COMP.
      03  QUANTITY   PIC   9(9)   COMP.
```

| DATA ITEM NAME | | | VALUE |
|---|---|---|---|
| ORDER | | ADDRESS | WWW PREFECTURE XX CITY YY WARD ZZZZ |
| | ITEM (1) | ITEMNAME | MY BOOK |
| | | PRICE | 1000 |
| | | QUANTITY | 2 |
| | ITEM (2) | ITEMNAME | YOUR BOOK |
| | | PRICE | 1500 |
| | | QUANTITY | 3 |

FIG. 10

```
        :
<!ELEMENT A   ( (B1 | B2), C?, D+) >
<!ELEMENT B1  (#PCDATA) >
<!ELEMENT B2  (#PCDATA) >
<!ELEMENT C   (#PCDATA) >
<!ELEMENT D   (#PCDATA) >
        :
```
— 81

```
        :
05  A.
   10  B1   PIC X (20).
   10  B2   PIC X (20).
   10  C    PIC X (20).
   10  D    PIC X (20) OCCURS 10.
        :
```
— 82

```
        :
05  A.
   10  B1   PIC X.
   10  B2   PIC X.
   10  C    PIC X.
   10  D    PIC 9 (9).
        :
```
— 83

FIG. 11

```
        :
<!ELEMENT  room   (#PCDATA)>
<!ATTLIST  room   smoking (yes | no) "no">
        :
```
— 91

```
        :
<room  smoking="no">0308</room>
        :
```
— 92

```
        :
05  ROOM
   10  ATTLIST.
      15  SMOKING  PIC  X(3).
   10  VAL  PIC  X(4).
        :
```
— 93

SYSTEM AND METHOD FOR MAPPING STRUCTURED DOCUMENT TO STRUCTURED DATA OF PROGRAM LANGUAGE AND PROGRAM FOR EXECUTING ITS METHOD

BACKGROUND OF THE INVENTION

1. Field of the Invention

The present invention relates to a system and a method for processing external data by a program language. More particularly, it relates to a system, a method, and a program for processing structured documents by the program language.

2. Description of the Related Art

The structured documents the representative of which is of XML (extensible Markup Language) are used in a variety of purposes. In particular, when the structured documents are used as a data-exchanging format between companies, the data needs to be processed using a program language.

Although the structured documents themselves have no other physical structure than strings of characters, the structured documents represent a structure by grammatical rules within the character strings. A syntax equipped with a start-tag and an end-tag is prepared, and the character string data is surrounded by these tags, thereby expressing an element included in the structured documents. Another element surrounded by a start-tag and an end-tag may be located inside the content of the surrounded character string data. This eventually represents a recursive nested-structure. This nested-structure is, logically, a tree structure. When viewing the nested-structured elements as the tree structure, the directly surrounded elements are defined as child nodes, and an element surrounding a child node directly is defined as a parent node, and the nodes sharing one and the same parent node are defined as brother nodes.

When manipulating such structured documents from a program language, there has existed no method for directly transcribing, into a structure of the program language, the tree-structured data included in the structured documents.

As a conventional technology, there has existed a method in which, after expanding the entire structured documents within a main storage as a tree structure where the respective elements are regarded as the nodes, this tree data structure is manipulated. For example, World Wide Web Consortium has recommended Document Object Model (http://www.w3.org/TR/REC-DOM-Level-1/), thus defining the various types of data-manipulating interfaces to the data structure expanded within the main storage as the tree structure.

Also, there exists a method in which, while scanning the structured documents, events are generated, thereby manipulating the structured documents in an event-driven manner. Namely, Simple API for XML (http://www.megginson.com/SAX/) had been developed in XML-DEV Mailing List, and has become the de-facto industry standard in processing the XML documents. In Simple API, while scanning the structured documents written in XML, the events are generated one after another for the encountered tags or the like, and the control is passed to a specific event-processing routine (which is referred to as "call back routine"), thereby making it possible to manipulate the structured documents.

In U.S. Pat. Nos. 6,085,196 and 6,279,015, there has been proposed an object-oriented system for mapping one structured information format to another structured information format. This system, however, has nothing to do with the program language processing system.

As will be explained below, there existed the following problem: When creating an application for processing the structured documents, creating the application is difficult with a program language that has no pointer-manipulating function or that has no function of registering the call back routine called up by an event.

Of the above-described prior arts, in the method of expanding the structured documents into the tree structure so as to manipulate the documents from a program language, the dynamical data structure is processed. For this reason, the language specification of the program language must include the pointer-manipulating function, or an object-reference manipulating function if the program language is an object-oriented language. Also, in the method of processing the structured documents in the event-driven scheme, the language specification of the program language must provide a unit for setting the call back routine called up for each event. Accordingly, with the above-described program language, e.g., the program language COBOL (JIS X 3002-1992, the computer program language COBOL) that, as the language specification, has no conceptions of the pointer for the data and of the pointer for the procedure routine, it is difficult to implement the programming in the event-driven scheme as well as the processing of the dynamical data structure.

It is an object of the present invention to provide a function of allowing the data included in the structured documents to be processed even in the program language that has no pointer-manipulating function or that has no function of registering the routine to be called up.

SUMMARY OF THE INVENTION

In order to accomplish the above-described object, a data transcription processing unit is located which is used by being called up from the program language. The data transcription processing unit inputs definition information on the document-structure of the structured documents, definition information on a structure of the program language corresponding to the document-structure of the structured documents, and correspondence information on the correspondence between the document-structure definition and the structure definition. By inputting all the information, based on the correspondence relationship and the type information between the respective elements in the structured documents and the respective items in the structure of the program language, the data transcription processing unit sets a method of transcribing the respective data including data type conversions.

When an application program issues, to the data transcription processing unit, a request for transcribing the content data in the structured documents into the structure of the program language, the processing unit transcribes the content data in the structured documents into the structure of the program language in accordance with the method set for the respective elements in the above-described manner. Also, as an opposite-direction data-transcribing request, the application program issues, to the data transcription processing unit, a request for transcribing the structured data of the program language into the structured documents. In this case, the processing unit transcribes the structured data of the program language into the structured documents in accordance with the method set for the respective items in the above-described manner.

The mere issuing of the requests to the above-described data transcription processing unit permits the application program to process the data included in the structured documents.

Incidentally, there is provided a program for converting the data structure in an inter-enterprise system. The data structure of structured documents used in common among the above-described enterprises is determined in advance. Next, the above-described program acquires definition information on the data structure of the structured documents used among the enterprises, definition information on a structure of a program language used inside each enterprise, and correspondence information on the correspondence between the data structure of the structured documents used among the enterprises and the structure of the program language used inside the above-described each enterprise. Moreover, based on the above-described information acquired, the program creates a flag structure for storing the state of the above-described structure of the program language, and a structure of the program language corresponding to the above-described flag structure. Finally, the program uses the above-described created flag structure and the above-described created structure of the program language corresponding to the flag structure, thereby making it possible to convert the above-described data structure.

BRIEF DESCRIPTION OF THE DRAWINGS

FIG. 5 illustrates the document-structure definition information in FIG. 4, and an example of the main body of a structured document created in accordance with the document-structure definition;

FIG. 6 illustrates an example of the structure definition 502 of a program language mapped to the entire document-structure definition information in FIG. 4;

FIG. 7 illustrates a data-set state in the case where the data in the main body of the structured documents illustrated in FIG. 5 are transcribed into the structure illustrated in FIG. 6;

FIG. 10 illustrates examples of structures where, in the case where an optional element or an iterated element exists in the document-structure definition information 1 on the structured documents, information on the presence or absence of the default or information on the number of the iterations is latched;

FIG. 11 illustrates an example of a structure where, in the case where an attribute is affixed to an element in the document-structure definition information 1, the attribute value is latched along with the content of the element;

DESCRIPTION OF THE EMBODIMENT

Hereinafter, the detailed explanation will be given concerning an embodiment in the present invention.

Figure 1:
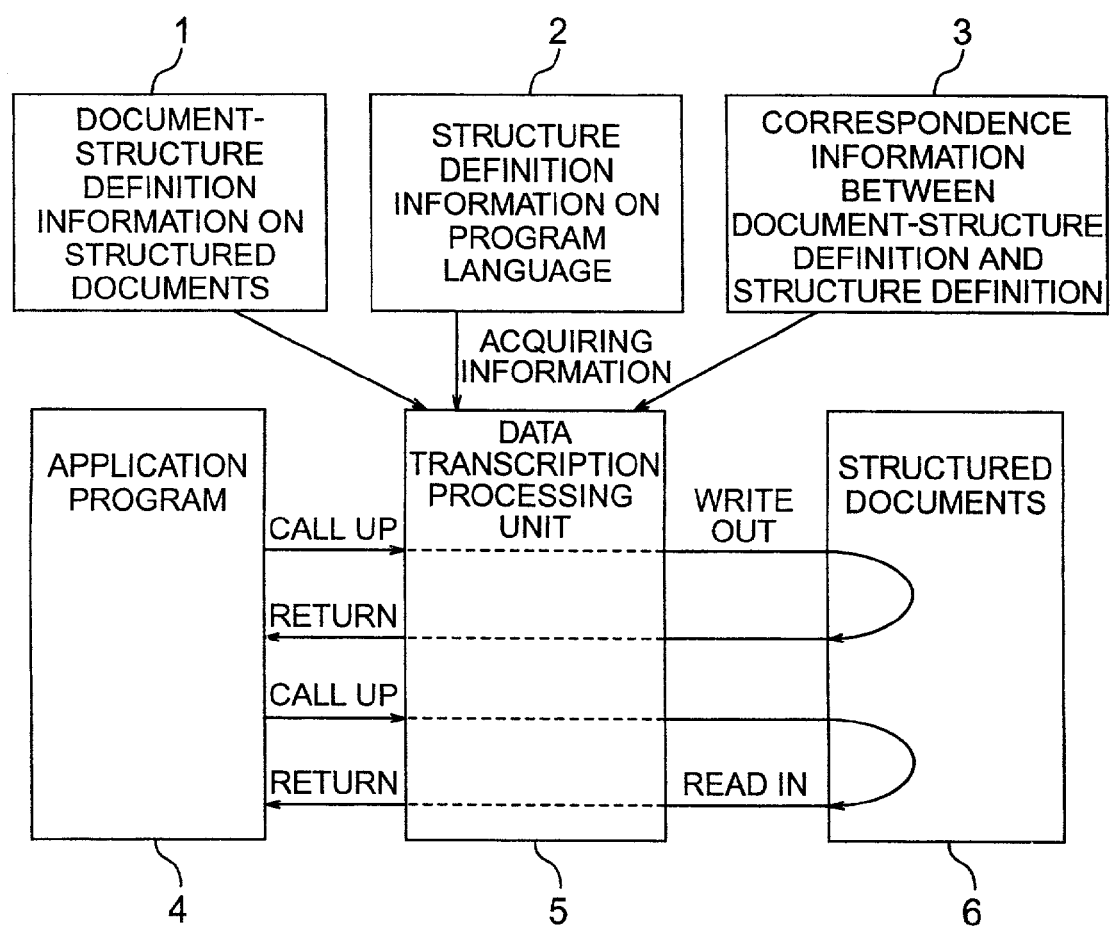
FIG. 1 is a block diagram for illustrating the logical system configuration of an application program for processing structured documents in the present invention.
Figure 2:
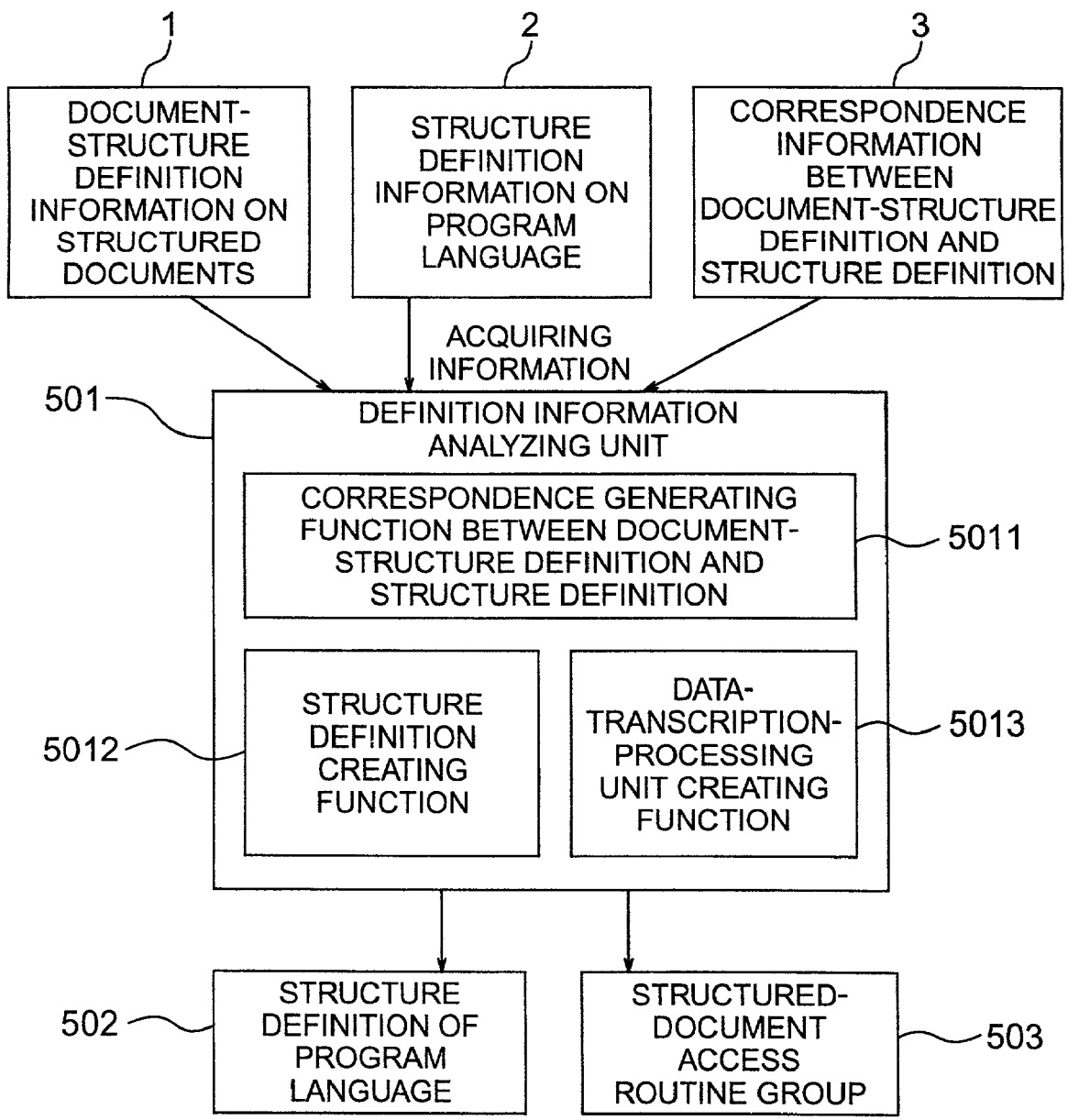
FIG. 2 is a block diagram for illustrating, as a part of a data transcription processing unit 5 of the system configuration in FIG. 1, a portion for creating a structured-document access routine group 503 in advance on the basis of the definition information analysis.
Figures 3, 4:
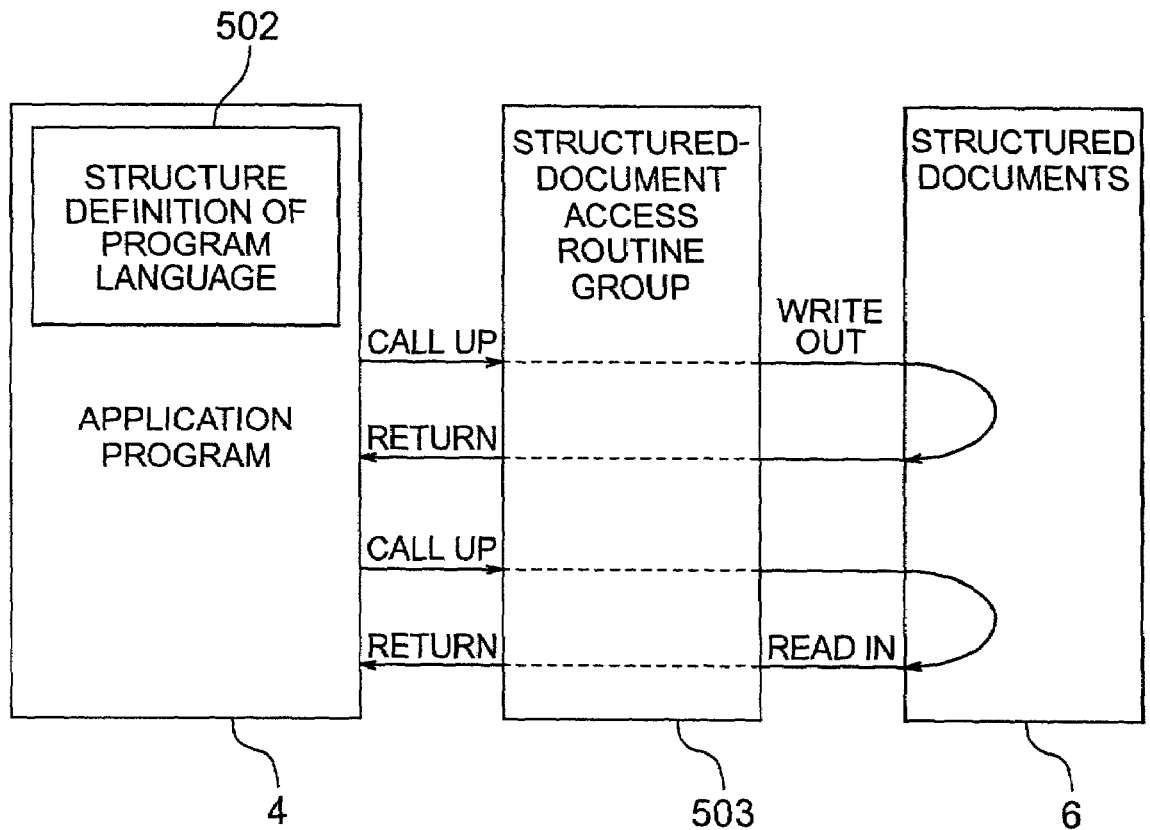
FIG. 3 illustrates a method of calling up, from the application program, the structured-document access routine group 503 created in FIG. 2, i.e., illustrates an embodiment for carrying out the system configuration in FIG. 1.
FIG. 4 illustrates an example of DTD (Document Type Definition) for declaring the document type of XML documents as document-structure definition information on the structured documents.
Figure 8:
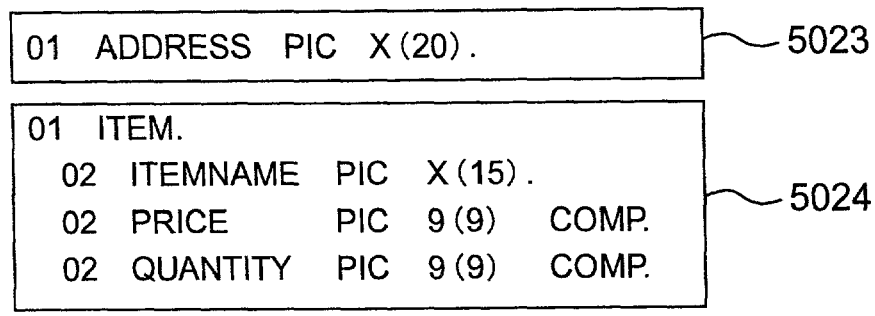
FIG. 8 illustrates an example of the structure definition 502 of the program language mapped to the document-structure definition information in FIG. 4 in a state of being divided into two.
Figure 9:
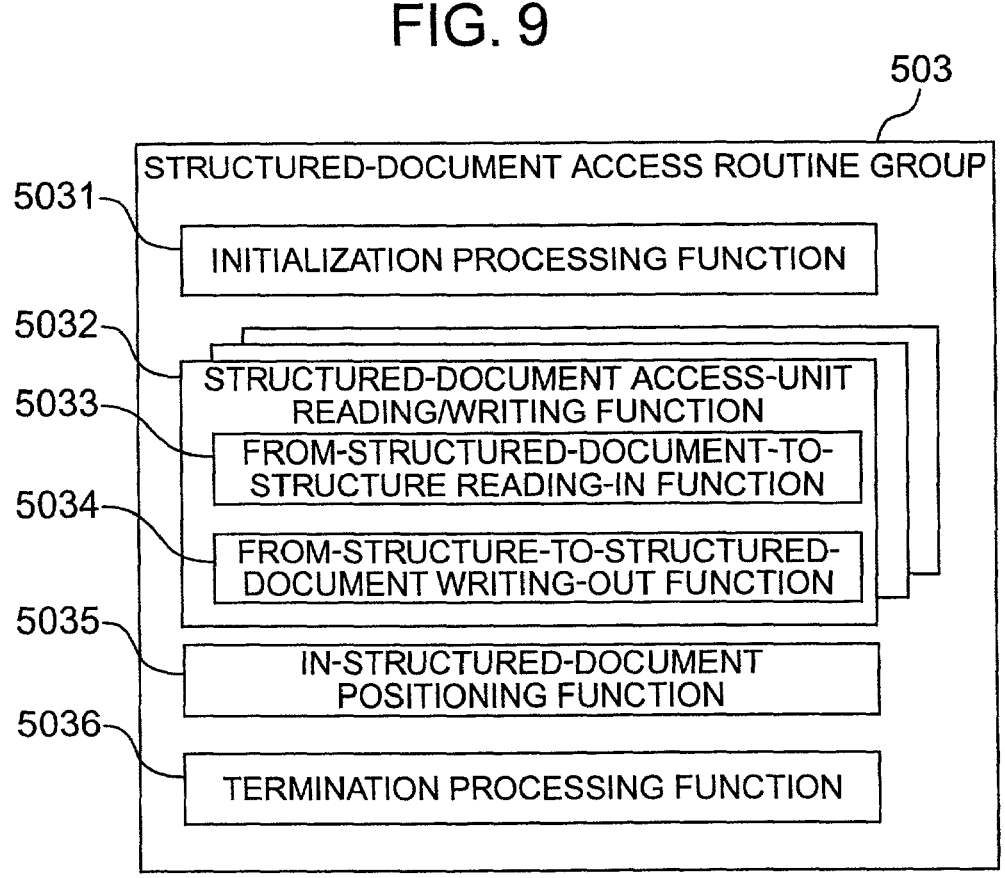
FIG. 9 is a block diagram for illustrating the function configuration of the structured-document access routine group 503.
Figure 12:
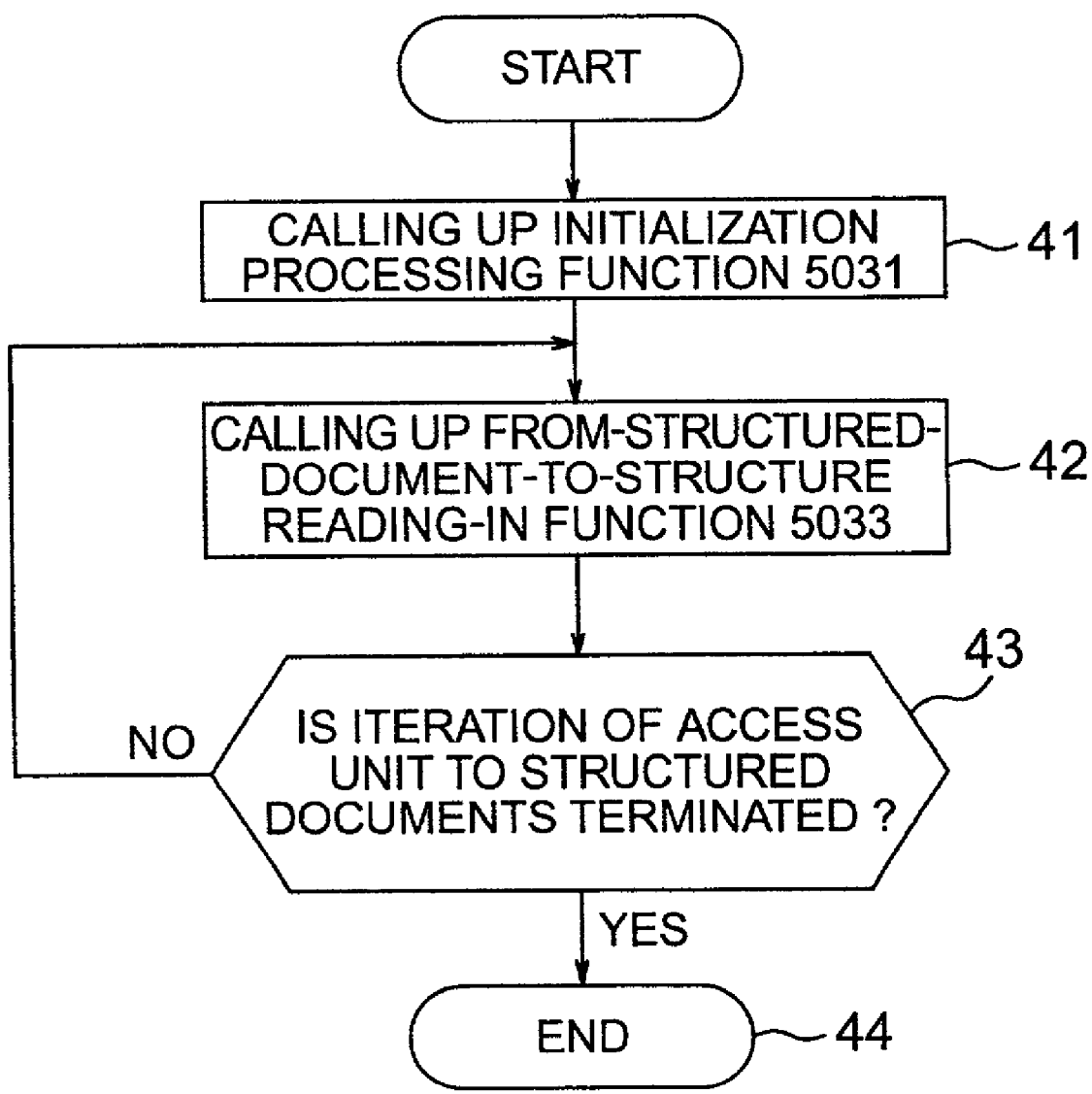
FIG. 12 illustrates a flow chart of a processing method where the application program 4 in FIG. 1 uses the data transcription processing unit 5 so as to read in the structured documents 6.

FIG. 1 illustrates the logical system configuration of an application program for processing structured documents in the present invention. FIG. 2 illustrates, as a part of a data transcription processing unit 5 of the system configuration in FIG. 1, a portion for creating a structured-document access routine group 503 in advance on the basis of the definition information analysis. FIG. 3 illustrates a method of calling up, from the application program, the structured-document access routine group 503 created in FIG. 2, i.e., illustrates an embodiment for carrying out the system configuration in FIG. 1. FIG. 4 illustrates an example of DTD (Document Type Definition) for declaring the document type of XML documents as document-structure definition information on the structured documents. FIG. 5 illustrates the document-structure definition information in FIG. 4, and an example of the main body of a structured document created in accordance with the document-structure definition. FIG. 6 illustrates an example of the structure definition 502 of a program language corresponding to the document-structure definition information in FIG. 4. FIG. 7 illustrates a data-set state in the case where the data in the main body of the structured documents illustrated in FIG. 5 are transcribed into the structure illustrated in FIG. 6. FIG. 8 illustrates another example of the structure definition 502 of the program language corresponding to the document-structure definition information in FIG. 4. FIG. 9 illustrates the function configuration of the structured-document access routine group 503. FIG. 10 illustrates examples of structures where, in the case where an optional element or an iterated element exists in the document-structure definition information 1 on the structured documents, the presence or absence of the default or the number of the iterations is latched. FIG. 11 illustrates an example of a structure where, in the case where an attribute is affixed to an element in the document-structure definition information 1, the attribute value is latched along with the content of the element. FIG. 12 illustrates a flow chart of a processing method where the application program 4 in FIG. 1 uses the data transcription processing unit 5 so as to read in the structured documents 6.

In the configuration of the data transcribing system in FIG. 1, the data transcription processing unit 5 acquires the document-structure definition information 1 on the structured documents, structure definition information 2 on a program language, and correspondence information 3 between the document-structure definition and the structure definition. By acquiring all the information, the processing unit 5 establishes a data transcription processing method between the structure and the structured documents 6, which is used by the application program 4. The application program 4 uses the data transcribing method where the structured documents 6 are read/written by calling up the data transcription processing unit 5 as needed. Instead of being called up by an explicitly-denoted calling-up syntax, the data transcription processing unit 5 may also be called up by the execution of an inputting/outputting syntax included in the program language.

At the time of executing the application program 4, the data transcription processing unit 5 may carry out the transcription processing by employing the method of acquiring the document-structure definition information 1 on the structured documents, the structure definition information 2 on the program language, and the correspondence information 3 between the document-structure definition and the structure definition. Otherwise, a routine that follows the data transcribing method established by acquiring all the information is created before executing the application program 4. Then, employing a method where the application program 4 uses the created routine, the transcription processing may also be carried out. In FIG. 2 or after, the explanation will be given concerning the embodiment in the present invention, employing the method where the establishment of the data transcribing method is performed in advance at a step before the execution of the application program.

In FIG. 2, a definition information analyzing unit 501 inputs the document-structure definition information 1 on the structured documents, the structure definition information 2 on the program language, and the correspondence information 3 between the document-structure definition and the structure definition. Here, in the case of, e.g., the XML documents, the document-structure definition information 1 on the structured documents is DTD. As the structure definition information 2 on the program language, the following are employed: A structure variable declaring portion in the source program, repository information used to the software development, immediate information by a compiler that has translated the variable declaring portion, or the like. The correspondence information 3 between the document-structure definition and the structure definition represents the correspondence from the respective elements in the structured documents to the respective items in the structure of the program language, including iterated elements, a selectable element, an optional element, or the like. Furthermore, if the structured documents have not defined the maximum value of the number of the iterated elements, the correspondence information specifies the maximum number of the iterations. Also, if the structured documents have not defined the maximum value of the character string length, the correspondence information specifies the maximum length of the elements as well.

Next, using a correspondence generating function 5011 between document-structure definition and structure definition, the definition information analyzing unit 501 causes both of the definitions to correspond to each other. Moreover, using a structure definition creating function 5012, the analyzing unit creates the structure definition 502 of the program language. Here, if the structure definition information 2 on the program language is the structure variable declaring portion in the source program, the structure definition information 2 is the same as the structure definition 502 of the program language and thus the structure definition creating function 5012 is unnecessary. Also, if an equivalence equivalent to the structure definition 502 of the program language is created from the structure definition information 2 on the program language by a tool or the like, the structure definition creating function 5012 is also unnecessary.

Still next, using a data-transcription-processing-unit creating function 5013, the definition information analyzing unit 501 creates the structured-document access routine group 503. Here, the structured-document access routine group 503 is a routine group for transcribing the data in accordance with the correspondence information 3 between the document-structure definition and the structure definition. In addition, in accordance with the structure definition information 2 on the program language, the routine group 503 also performs data type conversions such as the conversion from the character strings to numerical values.

The correspondence information 3 between the document-structure definition and the structure definition can combine not only into the document-structure definition information 1 on the structured documents but also into the structure definition information 2 on the program language.

In the case where all the document-structures defined by the document-structure definition information 1 on the structured documents, or all the structures of a certain element portion are caused to correspond to a structure of a program language without changing the tree structure thereof, it is possible to uniquely determine the construction of the structure of the program language from the tree structure of the structured documents. As a result, there is no need of the correspondence information on the format of the tree structure. Consequently, by integrating, into the correspondence information 3 between the document-structure definition and the structure definition, the type information corresponding to the respective elements in the structured documents, the structure definition information 2 on the program language becomes unnecessary.

Contrary to this, in the case where all the data items defined by the structure definition information 2 on the program language, or all the structures of a certain portion of the structure are caused to correspond to the structured documents without changing the structures thereof, it is possible to uniquely determine the tree structure of the structured documents from the construction of the structure of the program language. As a result, the document-structure definition information 1 on the structured documents is unnecessary. In this case, the structure definition creating function 5012 in the definition information analyzing unit 501 replaces the structure definition creating function by a document-structure definition information creating function, thereby making it possible to create the document-structure definition information 1 on the structured documents.

In FIG. 3, the application program 4 calls up, as needed, the structured-document access routine group 503 created by the definition information analyzing unit 501 in FIG. 2, thereby reading/writing the structured documents 6. At this time, the application program 4 fetches the structure definition 502 of the program language created by the definition information analyzing unit 501 in FIG. 2, then using the structure definition 502 for exchanging the read/written data.

FIG. 4 illustrates an example of DTD in XML as an example of the document-structure definition information 1 on the structured documents. In a declaration 71 of an element "order", the element "order", the element name of which is common to the name of this document type, indicates a root element of the document type. Also, the element "order" defines that it has, in its inside, one address element and one or more item elements in this sequence. The address element and the item elements are declared in a declaration 72 and a declaration 73, respectively.

In the access routine group 503, as a unit of the access, the entire structured documents 6 can be selected, or a part thereof can be selected. When creating the access routine group 503 for the access to the structured documents of the document type defined in FIG. 4, the "order" element is selected as the unit for accessing the structured documents 6. In this selection, the application program 4 turns out to access the entire documents at a time, since the order is the root element of the document type. Meanwhile, the access routine group 503 is created under a condition of dividing the access unit into the "address" element and the "item" elements. In this selection, the application program 4 accesses the "address" element first, and then accesses the "item" elements one or more times repeatedly, thereby making it possible to access the entire structured documents 6. Specifying the access unit is performed in the structure definition information 2 on the program language, or in the correspondence information 3 between the document-structure definition and the structure definition.

FIG. 5 illustrates, along with the DTD in FIG. 4, an example of the main body of an XML document created in accordance with the DTD in FIG. 4. In the case where the "order" element declared in the declaration 71 is selected as the access unit by the access routine group 503, the main body (710) of the structured document is accessed at a time. Also, in the case of dividing the access unit by the access routine group 503 into the "address" element declared in the declaration 72 and the "item" elements declared in the declaration 73, 2-times accesses, i.e., an access to an "address" element (720) in the XML document and an access to "item" elements (731, 732) in the XML document, are performed, thereby accessing the entire document.

FIG. 6 illustrates an example of the structure definition 502 of a program language, i.e., a structure definition (5021) of the program language COBOL which, corresponding to the DTD illustrated in FIG. 4, is created in selecting, as the access unit, the "order" element declared in the declaration 71. Here, the data item names in COBOL illustrated in FIG. 6, i.e., "ORDER", "ADDRESS", "ITEM", "ITEMNAME", "PRICE", and "QUANTITY" are caused to correspond to the element names declared in FIG. 4, i.e., "order", "address", "item", "itemname", "price", and "quantity", respectively. The following have been declared, respectively: The data item "ADDRESS" a 20-character alphanumeric-character item, the data item "ITEMNAME" a 15-character alphanumeric-character item, the data items "PRICE", "QUANTITY" a decimal 9-digit numeric-character item, and the number of the iterations of the data item "ITEM" 2 times. In this way, although not specified in the document-structure definition information 1 on the structured documents in FIG. 2, the information such as the length information, the type information, and the maximum number of the iterations of the iterated item become necessary in the structure definition 502 of the program language. All these information are set beforehand into the structure definition information 2 on the program language, or into the correspondence information 3 between the document-structure definition and the structure definition.

FIG. 7 illustrates a data-set state (5022) in the case where the data of the respective elements in the main body (710) of the structured document illustrated in FIG. 5 are transcribed to the respective data items in the structure definition (5021) of the program language COBOL illustrated in FIG. 6. Each data item name in FIG. 7 corresponds to each data item name of the same name in FIG. 6. With respect to the 2-time iterations of the "item" elements (731, 732) in FIG. 5, a data item "ITEM" is iterated 2 times, and element data corresponding to each data item "ITEM" are set.

FIG. 8 illustrates another example of the structure definition 502 of the program language i.e., an example where, corresponding to the DTD illustrated in FIG. 4, two structure definitions are included. One structure definition is a structure definition (5023) of COBOL created in selecting, as the access unit, the "address" element declared in the declaration 72. (Additionally, the "address" element is an end-terminal element and has no structure inside, and thus the definition of COBOL here has become a fundamental-type data item that has no structure inside either.) The other structure definition is a structure definition (5024) of COBOL created in selecting, as the access unit, the "item" elements declared in the declaration 73. Here, the data item names illustrated in FIG. 8, i.e., "ADDRESS", "ITEM", "ITEMNAME", "PRICE", and "QUANTITY" are caused to correspond to the element names declared in FIG. 5, i.e., "address", "item", "itemname", "price", and "quantity", respectively. Unlike the structure definition (5021) in FIG. 6, the iterations of the item elements are not specified. Instead of this, the accesses to the "item" elements are iterated within the application program 4, thereby accessing the plurality of "item" elements.

In FIG. 9, the structured-document access routine group 503 includes an initialization processing function 5031, a structured-document access-unit reading/writing function 5032, an in-structured-document positioning function 5035, and a termination processing function 5036. The structured-document access-unit reading/writing function 5032 includes a from-structured-document-to-structure reading-in function 5033 and a from-structure-to-structured-document writing-out function 5034.

One structured-document access-unit reading/writing function 5032 is created for each access unit. Accordingly, in the case where a plurality of access units are set for one document type, a plurality of structured-document access-unit reading/writing functions 5032 are created. A set of entry points to the routine for implementing a structured-document access-unit reading/writing function 5032 may be created for each access unit. Otherwise, the set of entry points are created, and an access unit may be selected based on information given by an argument or the other methods at the time of the calling-up.

When reading in the structured documents 6, the initialization processing function 5031, first, reads in all the structured documents stored in a specified location (i.e., a file name and an address in the main storage), then expanding the structure of the structured documents into a tree-structured data structure within the main storage. When writing out the structured documents 6, the initialization processing function secures or registers a specified writing-out location (i.e., a file name and an address in the main storage). In the case of the reading-in as well as in the case of the writing-out, if a file is to be specified as the storing location of the structured documents, the file is opened in advance. When performing the reading-in and the writing-out toward the structured documents 6, the initialization processing function executes the above-described initialization for the reading-in and that for the writing-out.

Any one of the structured-document access-unit reading/writing functions 5032 latches, as a state, the present position of the access target within the structured documents. The initial state is at the head of the structured documents.

Any one of the from-structured-document-to-structure reading-in functions 5033, from the structured documents expanded into the tree structure within the main storage, reads in the element data by the amount of the access unit into the corresponding data items in a given structure, thereby implementing the data transcription. As the embodiments therefor, there exist a method of reading in the access unit from the present position, and a method of retrieving the corresponding access unit from the present position in a forward or backward direction in the structured documents so as to read in the access unit thus found.

Here, a termination position of the read-in elements is latched as the present position information. Next, when any one of the from-structured-document-to-structure reading-in functions 5033 is called up, the access unit existing in the backward direction from the present position is searched for, then being read in the given structure. When any one of the from-structured-document-to-structure reading-in functions 5033 is called up, if there exists no corresponding access unit within the structured documents, an error code is returned. This provides the application program 4 with an opportunity for selecting the next manipulation.

Whenever the from-structure-to-structured-document writing-out function 5034 is called up, the function 5034 directly writes out, as the character strings in the structured documents, the structured data passed by the argument or the other methods, thereby implementing the data transcription. As the embodiments therefor, there exist a method of writing out the data from the present position, and a method of retrieving a position at which the corresponding access unit can exist from the present position in the structured documents in the backward direction, and of writing out the access unit at the position thus found. In accordance with the following steps, the from-structure-to-structured-document writing-out function 5034 processes the data stored in the structure of the given access unit, thereby creating the character strings in the structured documents: A data item is of either the structure type or the fundamental type. The structure type is of a structure that has one or more data items (the structure type or the fundamental type) inside. At first, if the data item is of the fundamental type, in accordance with the type, the data item is converted into a character string representing the data value. Then, the character string after the conversion is surrounded by the start-tag and the end-tag of an element specified in the correspondence information 3 between the document-structure definition and the structure definition. If the data item is of the structure type, all the data items included in the structure are surrounded by start-tags and end-tags, and then whole surrounded data items are surrounded by the start-tag and the end-tag of the element specified in the correspondence information 3 between the document-structure definition and the structure definition. Incidentally, as an option that is selectable by giving the information through an argument or the other methods at the time of the calling-up, it is possible to provide, into the from-structure-to-structured-document writing-out function 5034, a function of deleting an extra null space before or after the character string representing the data value.

In the case where the access unit to the structured documents is divided as is illustrated in FIG. 8, even if the structure 5023 or the structure 5024 is written out, the above-described steps alone do not affix the start-tag and the end-tag of the "order" element surrounding the whole elements. Not only in the writing-out of the start-tag and the end-tag on the outermost sides but also in the writing-out of two partial access units, there are some cases where no tags are similarly affixed. Accordingly, the from-structure-to-structured-document writing-out function 5034 is provided with a function of automatically affixing a start-tag and an end-tag that, when writing out a partial access unit, must appear before the writing-out thereof. Also, the termination processing function 5036 is provided with a function of affixing tags that should be closed before the structured documents 6 are terminated.

As another embodiment of the from-structure-to-structured-document writing-out function 5034, there exists the following embodiment: The structured data passed by the argument or the other methods at each calling-up are converted into a partially tree-structured representation of the structured documents, then being added to the structured documents converted into the tree-structured representation within the main storage. Next, when the termination processing function 5036 is called up, the structured documents in the character string representation are created from the entire tree-structured representation. In this embodiment as well, there exist the method of writing out the data from the present position, and the method of retrieving the position at which the corresponding access unit can exist from the present position in the structured documents in the backward direction, and of writing out the access unit at the position thus found. In the case of, e.g., the XML documents, the tree structure in the Document Object Model format is created and, based on the present Document Object Model format tree structure, the termination processing function 5036 creates the XML documents in the character strings. In this embodiment, the application program 4 need not select, as the access unit, a portion within the structured documents 6 that will not be modified. Accordingly, this embodiment is suitable for an application for amending only a part of existing structured documents.

The in-structured-document positioning function 5035 receives information for indicating a position in the structured documents, then setting the present position at this position newly. In the case of XML, XML Path Language (http://www.w3.org/TR/1999/REC-xpath-19991116) is available concerning the method of indicating a position in the structured documents.

The termination processing function 5036 performs processings such as a file closing processing, a memory freeing processing, and an unclosed-tag affixing processing. The from-structure-to-structured-document writing-out function 5034 may create the structured document in the tree-structured representation, and the termination processing function 5036 creates the structured documents in the character string representation.

In FIG. 10, a partial DTD (81) in XML defines the following document-structure: An element B1 or B2 exists inside an element A, and next thereto, an element C may exist but is optional, and finally, an element D is iterated one or more times. Also, the DTD (81) defines that the elements B1, B2, C, and D are character string data, respectively. A partial structure (82) of COBOL is an example of the structure corresponding to the partial DTD (81), and data items A, B1, B2, C, and D correspond to the elements A, B1, B2, C, and D, respectively. The data items B1, B2, C, and D are each defined as the fixed value of a 20-character-long alphanumeric-character item, and the number of the iterations of the data item D is defined as the fixed value of 10 times. The data item A is defined as a structure including these data items. Here, although the elements B1 and B2 are selectable elements, the elements B1 and B2 are each caused to correspond to the independent data items. Instead, the data item B2 may be defined as a redefined item of the data item B1, thereby causing the data items to share the data region.

When selecting the element A as the access unit to the structured documents, at the time of reading in the structured documents, the above-described method alone does not allow the application program to confirm the following: Which of the elements B1 and B2 has existed, whether or not the element C has existed, and how many times the element D has occurred. Also, at the time of reading out the structured documents, the application program can not specify which of the elements B1 and B2 will be written out, whether or not the element C will be written out, and how many times the element D will be written out. Accordingly, the structure definition creating function 5012 is provided with a function of creating, as a part of the structure definition 502 of the program language, a flag structure as well for storing the presence or absence of existence of an element and the occurrence number of the element. Also, a function of setting a value into the flag structure is further added to the from-structured-document-to-structure reading-in function 5033. A function of writing out the structured documents in the access unit in accordance with the value set into the flag structure is further added to the from-structure-to-structured-document writing-out function 5034. (Incidentally, the flag structure latches the state of a structure, which means the presence or absence of data, the data length, the data type, the occurrence number of the data, or the like. The flag structure will be explained below in more detail, using (83) in FIG. 10.)

The partial structure (83) of COBOL is an example of the flag structure corresponding to the partial DTD (81) and the partial structure (82) of COBOL. Corresponding to the elements B1, B2, and C, data items B1, B2, and C have a 1-character data value, thus representing the presence or absence of the existence of the elements. Also, corresponding to the element D, a data item D has a decimal 9-digit data value, thus representing the occurrence number of the iterated element.

The flag structure is also usable for the purpose of representing information on the start position and the data length on each structured data item corresponding to each element data in the structured documents. When the from-structured-document-to-structure reading-in function 5033 transcribes the character string of each element data in the structured documents into each fixed-length data item in the structure, the reading-in function 5033 inserts some type of pad character before or after each data. If the situation is left as it is, the application program 4 cannot distinguish, from the character embedded as the pad, the portion that has originally been the data on the structured documents. Then, the flag structure is provided with the information on the start position and the data length where the actually read-in data has been stored in correspondence with each data item. This permits the application program 4 to recognize the actually read-in data portion. Also, when the from-structure-to-structured-document writing-out function 5034 transcribes the character string data stored into each data item in the structure into each element in the structured documents, the writing-out function 5034 transcribes the character string data partially in accordance with the information on the start position and the data length stored into the corresponding flag structure. This permits the application program 4 to control the data portion to be transcribed.

Furthermore, the flag structure is also usable for the purpose of representing a state where the data in the structured documents are not completely contained into the data region prepared as the structure. When the from-structured-document-to-structure reading-in function 5033 reads in the structured documents, if the element data length or the iteration number of the iterated element exceeds the data length or the iteration number defined fixedly on the corresponding structure side, the reading-in function 5033 cannot transcribe the overflowed data. A flag for indicating that the iteration number has exceeded the number prepared in the data structure and a flag for indicating that the data length has exceeded the length prepared therein are added to the flag structure. Moreover, the data item of information on the actual data iteration number and the data item of information on the actual data length are added, and the from-structured-document-to-structure reading-in function 5033 sets all the information. This permits the application program 4 not only to recognize a reading-in error state but also to execute an error-reacting processing.

Incidentally, there also exists an embodiment where, without using the flag structure, the presence or absence of the existence of the elements is represented in the following way: The respective values (default values) that are to be set at the time of the default into the respective fundamental-type data items included in the structure are specified in advance in the correspondence information 3 between the document-structure definition and the structure definition. Next, the structured-document access-unit reading/writing function 5032 utilizes the respective specified values, thereby representing the presence or absence of the existence. The from-structured-document-to-structure reading-in function 5033 reads in the content data in the structured documents 6 into the structure. At the same time, the reading-in function 5033 sets the default values into data items corresponding to a selectable element that has not been selected and an optional element that has not existed, and into data items into which the data has not been read in when the actual iteration number of the iterative element in the structured documents is smaller than the iteration number prepared in the structure. Conversely, the from-structure-to-structured-document writing-out function 5034 does not write out the elements corresponding to the data items into which the default values have been set. Accordingly, at the time of the reading-in, the application program 4 can recognize that the elements corresponding to the data items into which the default-time set values had been set have not existed in the structured documents 6. The default values had been set into the data items in advance, thereby, at the time of the reading-out, allowing the application program 4 to specify an element that will not be written out.

In this embodiment, as compared with the embodiment using the flag structure, there exist several functional limitations: The default of the element cannot be represented not at the level of the fundamental-type data item but at the level of the structure-type data item, and the default-time set values need to be excluded from the meaningful data. Also, it is necessary to separately prepare a unit for representing that the iteration number in the structured documents has exceeded the iteration number prepared in the structure. Also, the data items prepared in correspondence with the selectable element are prepared as mutually independent data items sharing no data region, thereby making it necessary to be able to judge the respective default-time set values. However, there is no need of preparing another structure differing from the original data processing structure, which simplifies the processing of the data.

In FIG. 11, a partial DTD (91) defines an element "room" and an attribute "smoking" that belongs to the element "room". A partial XML document (92) is an example of the XML document in accordance with the partial DTD (91). In the document (92), 0308 and "no" are set into the content data of the element "room" and the attribute "smoking", respectively. Along with the content data of the element surrounded by a start-tag and an end-tag, in order to process the attribute value of the element with the structure of a program language, a structure that has a data item for the attribute value and a data item for the element content is defined within the structure in correspondence with the element in the structured document. A partial structure definition (93) of COBOL is an example of the structure of COBOL that represents both the attribute value and the element content with respect to the partial DTD (91). In COBOL, the value of the element "room" is caused to correspond to a data item "VAL" within the structure "ROOM", and the value of the attribute "smoking" of the element "room" is caused to correspond to a data item "SMOKING" within a structure "ATTLIST" within the structure "ROOM".

In the case where the attribute information is included in the document-structure definition information 1 on the structured documents, a data item for storing the attribute information is defined in the structure definition information 2 on the program language. At the same time, the correspondence between the both is specified in the correspondence information 3 between the document-structure definition and the structure definition. Moreover, the data-transcription-processing-unit creating function 5013 creates the structured-document access routine group 503 including a transcription processing of the attribute information.

FIG. 12 illustrates a flow chart of the processing by which the application program 4 reads in the structured documents 6. The structured-document access routine group 503 has been created beforehand. The program 4 calls up the routine group 503, thereby reading in the structured documents 6.

First, the initialization processing function 5031 is called up, thereby performing the necessary initialization processings such as the opening processing of the file where the structured documents have been stored and the expansion of the structured documents into the tree structure within the main storage (step 41). Next, the from-structured-document-to-structure reading-in function 5033 is called up. At this time, the corresponding structure is passed thereto by the argument or the other methods, thereby acquiring, into the structure, the structured document data by the amount of the access unit which have been set for the definition information analyzing unit 501 (step 42). Moreover, based on the result obtained by the from-structured-document-to-structure reading-in function 5033, it is judged whether or not the iteration of the access unit has been terminated (step 43). If the iteration continues, the processing goes back to the step 42. If the iteration has been terminated, the processing goes to a step 44, thus terminating this processing. When reading in the entire structured documents 6 at a time, the iteration processing based on the judgement at the step 43 is unnecessary. When reading out the structured documents 6, at the step 42, it is well enough to call up the from-structure-to-structured-document writing-out function 5034 instead of the from-structured-document-to-structure reading-in function 5033.

The access processing to the structured documents is simplified in this way.

As having been explained so far, according to the present invention, the mere calling-up of the structured-document access routine group permits the content data to be transcribed at a time between the structured documents and the structure of the program language. As a result, in accessing the content of the structured documents, the following procedures become unnecessary: Constructing the data structure dynamically, performing the pointer manipulation in order to browse the data structure, and making full use of the call back routine by the event processing while performing the state management. This condition makes it possible to decrease a burden in the programming as well as to reduce a probability of causing a program failure. Also, in particular, even in the program language such as COBOL that has no conception of the pointer, it becomes possible to process the structured documents.

Figure 13:
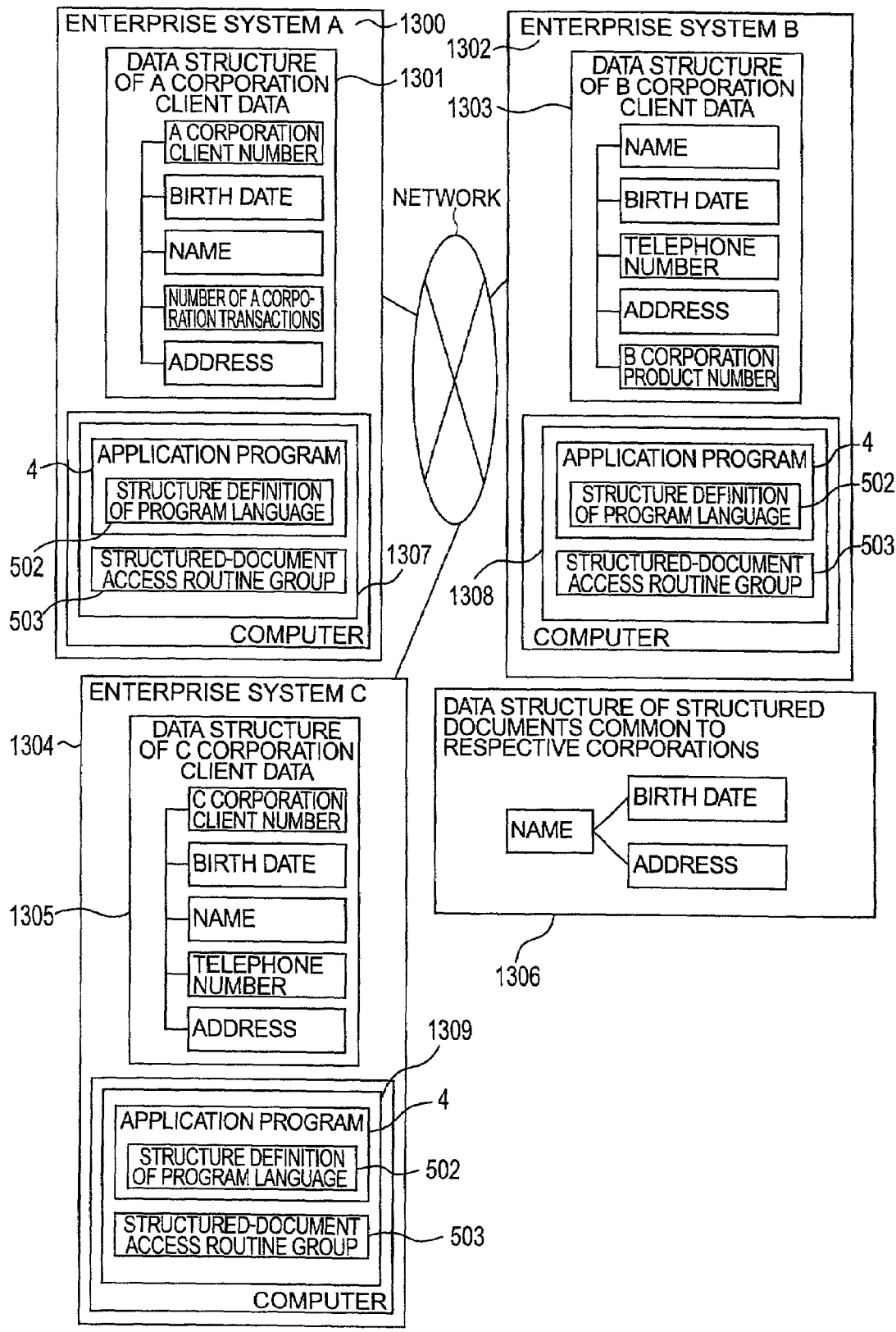
FIG. 13 illustrates an embodiment where the present invention is applied to an inter-enterprise system.

Referring to FIG. 13, the explanation will be given below concerning another embodiment in the present invention.

Here, the case will be presented where client data are exchanged among an enterprise system A (1300), an enterprise system B (1302), and an enterprise system C (1304). The following assumptions are made:

A data structure (1306) in the case where the data are exchanged among the enterprises is defined in advance.

Inside each enterprise, an application and a data structure which are characteristic of each enterprise are used.

For example, the data structure used inside the enterprise system A is a data structure (1301), and the enterprise system of A corporation has a program (1307) for making the conversion between the data structure (1301) used inside A corporation and the data structure (1306) used in common to the respective corporations. Incidentally, although not illustrated, each enterprise system has a hardware/software necessary for the business operation.

Similarly, the enterprise system B also has a program (1308) for making the conversion between a data structure (1303) used inside B corporation and the data structure (1306) used in common to the respective corporations.

Similarly, the enterprise system C also has a program (1309) for making the conversion between a data structure (1305) used inside C corporation and the data structure (1306) used in common to the respective corporations.

The data converting programs (1307, 1308, 1309) that the respective corporation systems include may have the configuration illustrated in FIG. 3 in the present invention, or may have another configuration. Additionally, although each of the data converting programs (1307, 1308, 1309) is illustrated as one program including the application program (4), the structure definition (502) of the program language, and the structured-document access routine group (503), the present invention may be carried out in a configuration other than this one.

As described above, the data structure of the structured documents transmitted/received among the enterprises is defined in advance, and each enterprise system has the converting program for making the conversion with the data structure used inside each enterprise. As a result, when making the data exchange among the enterprises, it becomes possible to execute the data exchange with another enterprise without modifying the data structure that has been used in each intra-enterprise system from conventionally. In each intra-enterprise system, the data structure used from conventionally need not be modified. This condition saves a trouble taken for the database management and the modification of an application used inside the enterprise from conventionally, thereby making it possible to reduce a time and labor taken for the system modification/construction. Also, even if the data exchange based on a new data structure becomes required, it is possible to decrease the influence exerted on the data resource/software resource used from conventionally.

Using the above-described programs, the present invention is also applicable to, e.g., the following case: Applications of COBOL are used in the respective intra-enterprise systems, and the data are managed inside the respective enterprises in data structures differing from each other, and a data structure transmitted/received among the enterprises is defined using the structured documents such as XML.

Figure 14:
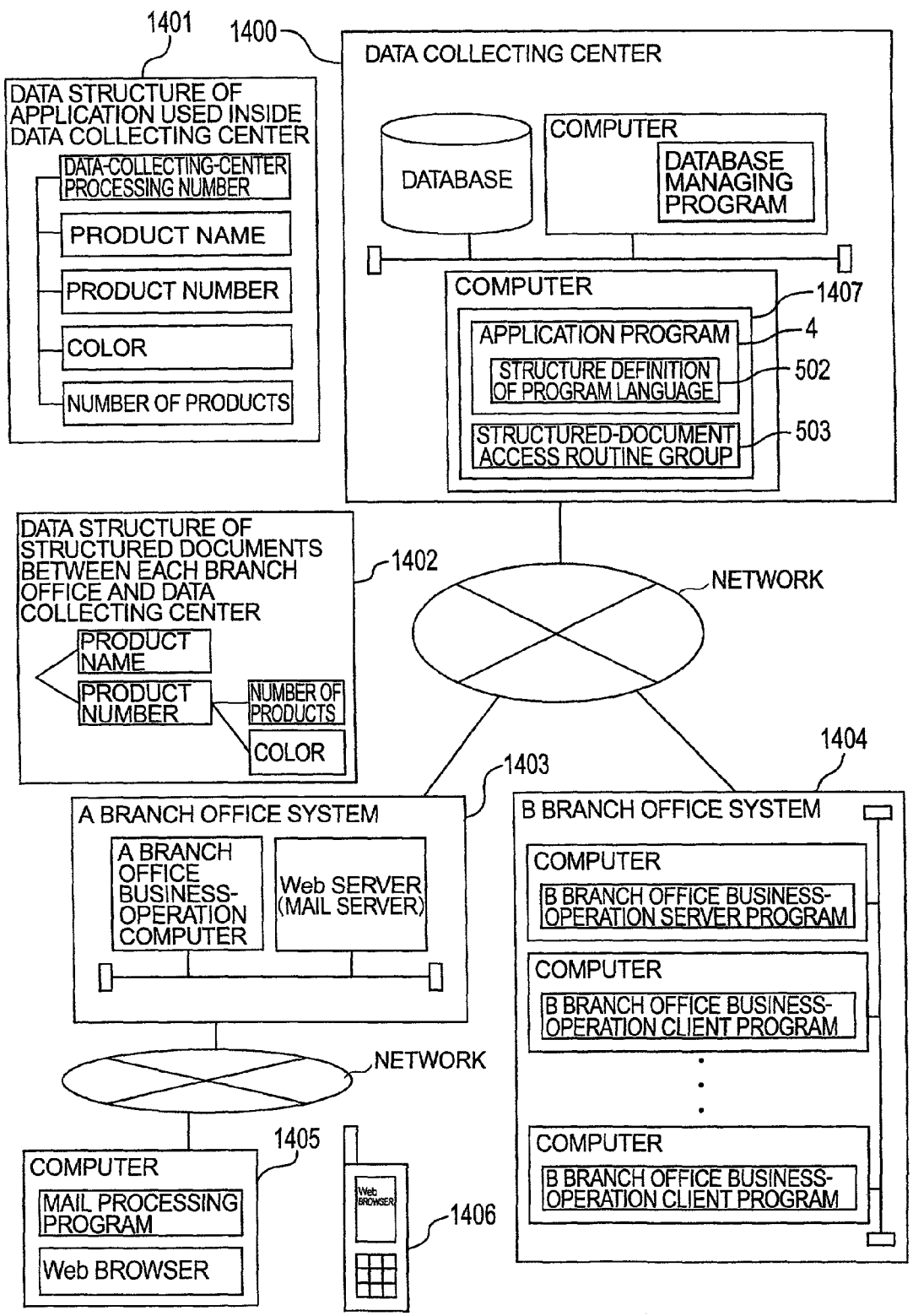
FIG. 14 illustrates an embodiment where the present invention is applied to a system between each branch office and a data collecting center.

Referring to FIG. 14, the explanation will be given below concerning still another embodiment in the present invention. Here, the following assumptions are made:

A data collecting center (1400), an A branch office system (1403), and a B branch office system (1404) are connected to each other via a network.

In the data collecting center, using a data structure (1401) used inside the data collecting center, data transmitted from each branch office is processed. Also, in the data collecting center, the data processing is performed using the data structure (1401) used inside the data collecting center.

In the A branch office system, order data from a client is received by a client terminal (1405), a mobile cellular-phone (1406), or the like via a mail program, a Web browser, or the like, then processing the order data inside the A branch office system. In the A branch office system, the data is managed using, e.g., a pointer.

In the B branch office system, a request from a B branch office business-operation client program is processed by a B branch office business-operation server program, and the data is managed in an array-type data structure.

In the data collecting center, in order to collect the data of the A branch office, the B branch office, and the other respective branch offices, a data structure (1402) used between each branch office and the data collecting center is defined in advance. Each branch office transmits/receives the data in accordance with the data structure (1402) used for the transmission/reception with the data collecting center. Using a data converting program (1407), the data collecting center converts the data structure (1402) received from each branch office into the data structure (1401) used inside the center, thereby performing the data collection processing.

In this way, applying the present invention allows the data from each branch office to be processed without modifying the data structure used inside the data collecting center from conventionally. This condition makes it possible to reduce a time and labor taken for the modification of the application inside the data collecting center.

The present invention is also applicable to, e.g., the following case or the like: An application of COBOL has been used inside the data collecting center from conventionally, and the structured documents such as XML are used for the data exchange between each branch office and the data collecting center.

As having been explained so far, the present invention allows the content data to be transcribed between the structured documents and the structure of the program language, thereby making it possible to reduce a burden in the programming.

What is claimed is:

1. A data transcribing method, performed by a computer, for transcribing data from data structure of a structured document to data structure of a program language, including the steps of:

acquiring definition information on document structure of said structured document, definition information on a structure of said program language, and correspondence information between said document structure of said structured document and said structure of said program language, creating, based on said acquired information, a transcription state storing structure for storing a state of each element for which data in said structured document is to be transcribed into data of said program language, and transcribing the data in said structured document into the data of said program language while setting the transcribing state of each element in said transcription state storing structure;

wherein, by specifying an iteration number for any specified partial element with partial element correspondence between said document structure of said structured document and said structure of said program language in said correspondence information, said transcription state storing structure for the specified iteration number of the specified partial structure is created, and wherein, for any specified partial element, the specified iteration number of pieces of data corresponding to said specified partial element in said structured document are transcribed into said structure of said program language while the transcribing state for the specified partial element is set in said transcription state storing structure.

2. A data transcribing method, performed by a computer, for transcribing data from data structure of a program language to data structure of a structured document, including the steps of:

acquiring definition information on document structure of said structured document, definition information on a structure of said program language, and correspondence information between said document structure of said structured document and said structure of said program language, preparing, based on said acquired information, a transcription state storing structure for storing a state of each element for which data of said program language is to be transcribed into data in said structured document, and transcribing the data of said program language into the data in said structured document while setting the transcribing state of each element in said transcription state storing structure, wherein, by specifying an iteration number for any a specified partial structure with partial structure correspondence between said document structure of said structured document and said structure of said program language in said correspondence information, said transcription state storing structure for the specified iteration number of the specified partial structure is created, and wherein, for any specified partial element, the specified iteration number of pieces of data corresponding to said specified partial structure in said program language are transcribed into said structure of said structured document while the transcribing state for the specified partial element is set in said transcription state storing structure.

3. The data transcribing method as claimed in claim 1, wherein, by specifying partial element correspondence between said document structure of said structured document and said structure of said program language in said correspondence information, said transcription state storing structure is created for the specified partial element, and wherein data corresponding to said specified partial element in said structured document is transcribed into said structure of said program language while the transcription state is set in the transcription state storing structure.

4. The data transcribing method as claimed in claim 2, wherein, by specifying partial structure correspondence between said document structure of said structured document and said structure of said program language in said correspondence information, said transcription state storing structure is created for the specified partial structure, and wherein data corresponding said specified partial structure in said structure of said program language is transcribed into said structured document while the transcription state is set in the transcription state storing structure.

5. A data transcribing system for transcribing data from data structure of a structured document to data structure of a program language, comprising:

a data transcription processing unit operable to acquire definition information on a document structure of said structured document, definition information on a structure of said program language, and correspondence information between said document structure of said structured document and said structure of said program language, the data transcription processing unit being further operable to:

create, based on said acquired information, a transcription state storing structure for storing a state of each element for which data in said structured document is to be transcribed into data of said program language, and transcribe the data in said structured document into the data of said program language while setting the transcribing state of each element in said transcription state storing structure;

wherein, by specifying an iteration number of any specified partial element with partial element correspondence between said document structure of said structured document and said structure of said program language in said correspondence information, said transcription state storing structure for the specified iteration number of the specified partial structure is created, and wherein, for any specified partial element, the specified iteration number of pieces of data corresponding to said specified partial element in said structured document are transcribed into said structure of said program language while the transcribing state for the specified partial element is set in said transcription state storing structure.

6. A data transcribing system for transcribing data from data structure of a program language to data structure of a structured document, comprising:

a data transcription processing unit operable to acquire definition information on a document structure of said structured document, definition information on a structure of said program language, and correspondence information between said document structure of said structured document and said structure of said program language, the data transcription processing unit being further operable to:

prepare, based on said acquired information, a transcription state storing structure for storing a state of each element for which data of said program language is to be transcribed into data in said structured document, and transcribe the data of said program language into the data in said structured document while setting the transcribing state of each element in said transcription state storing structure, wherein, by specifying an iteration number for any a specified partial structure with partial structure correspondence between said document structure of said structured document and said structure of said program language in said correspondence information, said transcription state storing structure for the specified iteration number of the specified partial structure is created, and wherein, for any specified partial element, the specified iteration number of pieces of data corresponding to said specified partial structure in said program language are transcribed into said structure of said structured document while the transcribing state for the specified partial element is set in said transcription state storing structure.

7. The data transcribing system as claimed in claim 6, wherein, by specifying partial element correspondence between said document structure of said structured document and said structure of said program language in said correspondence information, said transcription state storing structure is created for the specified partial element, and wherein data corresponding to said specified partial element in said structured document is transcribed into said structure of said program language while the transcription state is set in the transcription state storing structure.

8. The data transcribing system as claimed in claim 7, wherein, by specifying partial structure correspondence between said document structure of said structured document and said structure of said program language in said correspondence information, said transcription state storing structure is created for the specified partial structure, and wherein data corresponding said specified partial structure in said structure of said program language is transcribed into said structured document while the transcription state is set in the transcription state storing structure.

9. A computer program product embedded in a computer-readable medium for transcribing data from data structure of a structured document to data structure of a program language, the computer program product including:

a code segment including instructions for acquiring definition information on document structure of said structured document, definition information on a structure of said program language, and correspondence information between said document structure of said structured document and said structure of said program language, a code segment including instructions for creating, based on said acquired information, a transcription state storing structure for storing a state of each element for which data in said structured document is to be transcribed into data of said program language, and a code segment including instructions for transcribing the data in said structured document into the data of said program language while setting the transcribing state of each element in said transcription state storing structure;

wherein, by specifying an iteration number of any specified partial element with partial element correspondence between said document structure of said structured document and said structure of said program language in said correspondence information, said transcription state storing structure for the specified iteration number of the specified partial structure is created, and wherein, for any specified partial element, the specified iteration number of pieces of data corresponding to said specified partial element in said structured document are transcribed into said structure of said program language while the transcribing state for the specified partial element is set in said transcription state storing structure.

10. A computer program product embedded in a computer-readable medium for transcribing data from data structure of a program language to data structure of a structured document, the computer program product including:

a code segment including instructions for a data transcription processing unit operable to acquire definition information on a document structure of said structured document, definition information on a structure of said program language, and correspondence information between said document structure of said structured document and said structure of said program language;

a code segment including instructions for preparing, based on said acquired information, a transcription state storing structure for storing a state of each element for which data of said program language is to be transcribed into data in said structured document, and a code segment including instructions for transcribing the data of said program language into the data in said structured document while setting the transcribing state of each element in said transcription state storing structure;

wherein, by specifying an iteration number of any specified partial element with partial element correspondence between said document structure of said structured document and said structure of said program language in said correspondence information, said transcription state storing structure for the specified iteration number of the specified partial structure is created, and wherein, for any specified partial element, the specified iteration number of pieces of data corresponding to said specified partial element in said program language are transcribed into said structure of said structured document while the transcribing state for the specified partial element is set in said transcription state storing structure.

11. The computer program product as claimed in claim 9, wherein, by specifying partial element correspondence between said document structure of said structured document and said structure of said program language in said correspondence information, said transcription state storing structure is created for the specified partial element, and wherein data corresponding to said specified partial element in said structured document is transcribed into said structure of said program language while the transcription state is set in the transcription state storing structure.

12. The computer program product as claimed in claim 10, wherein, by specifying partial structure correspondence between said document structure of said structured document and said structure of said program language in said correspondence information, said transcription state storing structure is created for the specified partial structure, and wherein data corresponding said specified partial structure in said structure of said program language is transcribed into said structured document while the transcription state is set in the transcription state storing structure.

* * * * *